United States Patent [19]

Eilers

[11] Patent Number: 4,548,270
[45] Date of Patent: Oct. 22, 1985

[54] PROCESS FOR PLUGGING A SUBTERRANEAN FORMATION

[75] Inventor: Louis H. Eilers, Inola, Okla.

[73] Assignee: The Dow Chemical Company, Midland, Mich.

[21] Appl. No.: 539,518

[22] Filed: Oct. 6, 1983

[51] Int. Cl.$^4$ ............................................. E21B 33/138
[52] U.S. Cl. ................................. 166/291; 166/292; 166/300
[58] Field of Search .............. 166/291, 292, 293, 300, 166/270

[56] References Cited

U.S. PATENT DOCUMENTS

| | | | |
|---|---|---|---|
| 1,547,189 | 7/1925 | Wilson | 166/292 |
| 2,233,973 | 3/1941 | Dunn | 166/292 |
| 2,233,974 | 3/1941 | Dunn | 166/292 |
| 2,848,340 | 8/1958 | Haldas | 166/293 X |
| 3,625,286 | 12/1971 | Parker | 166/291 |
| 3,658,131 | 4/1972 | Biles | 166/292 |
| 3,672,173 | 6/1972 | Paramore et al. | 166/293 X |
| 4,014,174 | 3/1977 | Mondshine | 166/292 X |
| 4,054,461 | 10/1977 | Martin | 166/293 X |
| 4,083,407 | 4/1978 | Griffin, Jr. et al. | 106/81 X |
| 4,257,483 | 3/1981 | Morris et al. | 166/300 X |

Primary Examiner—George A. Suchfield
Attorney, Agent, or Firm—L. Wayne White

[57] ABSTRACT

Aqueous silicate solutions when admixed, intermingled or otherwise contacted with hydraulic cement slurries cause a very rapid gelation and accelerated setting of the hydraulic cement composition.

It has now been discovered that this rapid gelation/accelerated setting phenomenon can be controlled and substantially delayed by incorporating a water soluble inorganic phosphate salt into an aqueous spacer fluid positioned between said silicate solution and said cement slurry as such materials are being sequentially injected into a subterranean formation.

14 Claims, No Drawings

PROCESS FOR PLUGGING A SUBTERRANEAN FORMATION

BACKGROUND OF THE INVENTION

The present invention pertains to an improved method for plugging or sealing selected zones in a subterranean formation. More particularly, this invention relates to an improved method for plugging such subterranean zones via the sequential injection therein of an aqueous solution of a water soluble silicate material, an aqueous spacer material and aqueous hydraulic cement slurry.

In the drilling, completion and servicing of oil and gas wells, it is known that selected zones of a subterranean formation can be sealed or plugged off by injecting therein an aqueous sodium silicate solution. In connection with such a treatment, gellation of said sodium silicate solution can be brought about by causing said solution to contact a suitable brine in the desired subterranean location or by the addition to said solution, prior to injection thereof into the formation, of a reagent which induces a controlled, gradual gellation of said sodium silicate solution.

It is also known that the aforementioned sodium silicate gel formation can be followed by the injection of a hydraulic cement slurry. However, since hydraulic cement slurries rapidly gel and set up upon contact with such sodium silicate material, it is common practice to employ a water spacer to separate the cement slurry and the silicate solution from each other during the injection thereof into the subterranean formation of interest.

While the use of a water spacer during injection to separate the cement slurry from the silicate solution can be reasonably effective in preventing premature admixture thereof, it is nonetheless still possible for said materials to prematurely come into contact with each other and to set up at an undesired location during injection such as, for example, in the wellbore itself or at an unintended position within the subterranean formation. Accordingly, it would be highly desirable to provide a means of controlling (e.g., delaying) the gellation rate exhibited by a mixture of such materials and to thereby ensure or obtain continued mobility or pumpability of such a mixture for a limited period of time after the individual silicate solution and cement slurry ingredients thereof come into direct contact with each other.

SUMMARY OF THE INVENTION

It has now been discovered that if an aqueous silicate solution and a hydraulic cement slurry are mixed together in the presence of an effective amount of a water soluble, polybasic inorganic phosphate salt, the gellation and setting up of the resulting mixture is substantially delayed (e.g., for a period of up to several hours) as compared to the almost instantaneous gellation (e.g., in just a few seconds) which otherwise occurs in the absence of said water soluble inorganic phosphate materials.

Such discovery is embodied in one aspect of the present invention in the form of an improved process for plugging a zone in a subterranean formation which comprises sequentially injecting (a) an aqueous solution of a water soluble silicate material followed by (b) a quantity of an aqueous spacer material and finally, by (c) an aqueous hydraulic cement slurry and wherein the improvement comprises incorporating into the silicate solution, the aqueous spacer or the hydraulic cement slurry a water soluble, inorganic polybasic phosphate salt in an amount sufficient to reduce the rate of gel formation which occurs when said silicate material, spacer and hydraulic cement become intermingled with each other.

In another aspect, the present invention is a method of retarding or delaying the gelation or setting of an aqueous mixture of a water soluble silicate material and a hydraulic cement material by incorporating into said mixture an effective amount of a water soluble, polybasic inorganic phosphate salt.

The aforementioned method and improved process are particularly useful in those instances where it is desired to plug or seal off a selected zone of a subterranean formation such as, for example, where it is desired to plug off a lost circulation zone during a well drilling or cementing operation; to reduce or eliminate undesired formation brine flow in a producing well; to block off regions of high formation permeability in an injection well associated with an enhanced oil recovery operation; and the like.

DETAILED DESCRIPTION OF THE INVENTION

Silicate materials useful in the practice of the present invention include those water soluble silicate materials whose aqueous solutions are already known in the art to produce relatively rigid gels upon contact or admixture with concentrated sodiumbased brines or with calcium-containing brines or upon having their pH adjusted into a rapid gelation region via the addition of an acid or an acid producing material. Such silicate materials include the various alkali metal salts of silicic acid such as, for example, the lithium, sodium and potassium salts thereof.

A particularly preferred water soluble silicate material for use in the practice of the present invention is an aqueous sodium silicate solution having a 38 weight percent total dissolved solids content and having silicon dioxide ($SiO_2$) to sodium oxide ($Na_2O$) weight ration of about 3.2:1. However, sodium silicate solutions having different $SiO_2$:$Na_2O$ ratios (e.g., ranging from 0.5:1 to 4:1) may be employed instead if such should prove to be desirable from some practical standpoint such as cost, availability, etc. Similarly, silicate material can be initially acquired in the form of different solids content aqueous solutions or in solid form. However, the latter option is typically less desirable since special equipment is required to convert the solid material into an aqueous solution prior to its injection into the subterranean formation of interest.

In using the aforementioned aqueous silicate solution in the practice of the present invention, it is typically diluted prior to injection into the formation to a silicon dioxide content of from about 5 to about 25 weight percent. Most preferably, the $SiO_2$ content of said solution during injection is between about 10 and about 20 percent by weight.

In the present invention, it is typically desired to cause the soluble silicate solution to gel after it has reached the desired location in the subterranean formation and to then utilize the resulting silicate gel to cause the subsequently injected aqueous hydraulic cement slurry to be directed, confined and/or emplaced in a particular, desired location within said formation. Any con-ventional, known technique can be employed for inducing the initial gellation of said silicate solution. For example, if the zone of interest already contains a fairly concentrated sodium-based brine or a calcium-containing brine, the desired gelaton will occur spontaneously upon the silicate solution coming into contact with said brine. Otherwise, the injection of the silicate solution can be preceded by the injection of a quantity of a suitable, naturally occurring or synthetic brine. In this latter instance, of course, a fresh water spacer will typically be pumped between said brine injection and said silicate solution in order to prevent the inter-mingling, and accompanying gelation, thereof until after said materials exit the wellbore and enter the formation region of interest.

As yet another alternative, the initial gelation of the injected silicate solution can be induced by the incorporation therein (i.e., at the earth's surface prior to pumping or injection) of a suitable reagent to bring about gelation in a sufficiently gradual fashion to permit emplacement of said material prior to the gelation or setting thereof. For example, a strongly acidic material such as hydrochloric acid can be employed to adjust the pH of the aqueous silicate solution (which is normally in a pH range of 11.5 or above) into a range (for example, a pH in the range from 0.5 to 1.5) in which the gel time is sufficiently long to allow emplacement thereof in the desired subterranean location. (See for example, U.S. Pat. No. 3,375,872). Alternatively, a reagent which gradually releases a gelinducing material (e.g., multivalent metallic or alkaline earth metal ions or a weak acid material) can be incorporated into said aqueous silicate solution to bring about gradual gelation thereof following its emplacement into the desired underground location. (See for example, U.S. Pat. No. 2,208,766; Canadian Pat. No. 1,070,936; U.S. Pat. No. 3,435,899 and U.S. Pat. No. 3,294,563).

Hydraulic cement materials suitable for use in the present invention include those conventionally employed in oil and/or gas well cementing practices. Portland cements are typically preferred for this purpose and, of those, API Class A and API Class C Portland cements are especially preferred for use in the present invention.

The preparation and pumping of the hydraulic cement slurry in the present invention is generally pursuant to conventional oil and gas well cement slurry preparation and handling practices. For example, conventional cementing additives such as dispersants, fluid loss additives, etc. can be employed if desired. Similarly, the water contents of the cement slurries can suitably be in the normally employed range, but may vary somewhat in quantitative terms depending upon various factors such as the specific type of cement employed, etc. For example, when an API Class A Portland cement is employed, it is preferred to employ it in the form of a slurry having a water content of about 46% by weight of cement. On the other hand, when an API Class H Portland cement is employed, it is preferred to use a slurry containing about 38 weight percent water by weight of cement.

When an aqueous spacer is employed to separate the cement slurry from the silicate solution during the sequential injection thereof, it is preferred to employ a fresh water spacer. Otherwise, high concentrations of sodium ions and/or the presence of significant calcium ion concentrations in said spacer could induce gelation of the silicate solution at the silicate solution/spacer interface during injection through the wellbore. Naturally, however, it is possible to use a brine as the spacer if desired, so long as nature of it (e.g., the salt concentration and/or calcium content) is such that premature silicate gelation is avoided during injection.

Regardless of whether the aqueous spacer is based on fresh water or dilute brine materials, it can further contain various conventional spacer components such as polymeric thickner materials and the like as desired.

As has been previously noted, a key feature of the present invention involves the discovery that certain polybasic, inorganic phosphate salts are capable of substantially delaying or retarding the otherwise very rapid (e.g., in just a few seconds) gelation or setting up which occurs when a cement slurry and an aqueous silicate solution are admixed or intermingled. Suitable inorganic phosphate salts for this purpose include the various known water soluble, polybasic inorganic phosphate salts such as, for example, the water soluble dibasic or tribasic alkali metal or ammonium phosphate salts. Preferably the alkali metal phosphate salts, or alkali metal/ammonium phosphate salt mixtures, are employed to eliminate, or minimize, the generation or release of ammonia during use. Especially preferred phosphate salts for use herein are disodium phosphate and trisodium phosphate.

The aforementioned water soluble polybasic inorganic phosphate salt can be incorporated into the soluble silicate/cement slurry system in any convenient fashion so long as it is caused to be present at the time that said cement slurry and silicate solution initially come into contact or intermingle with each other. For example, the phosphate salt can be admixed into the cement slurry itself, the silicate solution itself or in both or an aqueous spacer fluid having said phosphate salt dissolved therein can be employed to separate the cement slurry from the silicate solution during the sequential injection thereof. Most preferably an aqueous spacer fluid is employed in the present invention and at least a portion of the requisite inorganic phosphate salt is dissolved therein.

The minimum amount of the water soluble, polybasic inorganic phosphate salt to be employed herein corresponds to an amount sufficient to reduce the gel formation rate upon the admixing or intermingling together of the hydraulic cement slurry and the silicate solution. The normal gelation time upon admixing such components in the absence of the aforementioned phosphate salt typically corresponds to just a few seconds. Preferably, the aforementioned phosphate salt is employed in the present invention in an amount sufficient to provide a delayed gelation time of at least about one-half hour, and preferably at least about one full hour, following the initial intermingling of the cement slurry and silicate solution components hereof.

In quantitative terms, the aforementioned phosphate salt will typically be employed in an amount ranging, on an anhydrous salt basis, from about 0.5 to about 5 (preferably from about 0.75 to about 2) weight percent based upon the combined weight of the cement slurry, the aqueous spacer (if any) and the silicate solution. In those cases where an aqueous spacer fluid is employed and wherein the phosphate salt is introduced into the system by dissolution into said spacer fluid, said phosphate salt will typically constitute from about 2 to about 20 (preferably from about 2 to about 10 and most preferably from about 2.5 to about 5) weight percent of said aqueous spacer fluid.

The present invention is further illustrated by reference to the following working examples.

EXAMPLE 1

A 40° Baume aqueous sodium silicate solution having a 3.22:1 SiO to Na$_2$O weight ratio is diluted by admixing 42.6 parts of weight thereof with 57.4 parts by weight of water.

One (1) part by weight of the resulting diluted sodium silicate solution is simultaneously admixed with two (2) parts by weight of an API Class A Portland cement slurry containing 46% water based on the weight of the cement and with one (1) part by weight of a series of different aqueous spacer compositions having different amounts of trisodium phosphate or disodium phosphate dissolved therein.

The phosphate salt content of the various spacer compositions along with the gel time for the corresponding blends prepared therewith are summarized in Table I below.

TABLE I

| Run Number | Phosphate Salt Type | Content[1] (Weight %) | Gel Time |
|---|---|---|---|
| 1* | None | None | 2 Sec. |
| 2 | Na$_3$PO$_4$.12H$_2$O | 5% | 5 Sec. |
| 3 | Na$_3$PO$_4$.12H$_2$O | 8% | 5 min. |
| 4 | Na$_3$PO$_4$.12H$_2$O | 10% | 2 hrs. |
| 5 | Na$_2$HPO$_4$ | 5% | 15 min. |

*Not an example of the present invention.
[1]Weight percent based on the total weight of the aqueous spacer material.

EXAMPLE 2

Large quantities of brine are being produced in an oil well. Normal perforation and cement squeeze operations in the water zone allow cement to enter the weaker water zone without sealing channels between the water and oil zone.

A 500 gallon batch of calcium chloride brine solution is prepared containing 9 weight percent CaCl$_2$ on a total weight basis. Two 1000 gallon batches of an aqueous sodium silicate solution are also prepared. Each 1000 gallon batch is prepared by adding 640 gallons of water to a tank and adding 350 gallons of 40°Be liquid sodium silicate solution (water glass containing about 38% solids, 3.22 ratio SiO$_2$ to Na$_2$O by weight) with agitation.

The well is perforated in the water zone and a squeeze packer is set between the perforations in the water zone and the producing perforations. The 500 gallon batch of CaCl$_2$ solution is pumped down the tubing into the water zone followed by 200 gallons of fresh water which is in turn followed by 2000 gallons of the sodium silicate mix and another 200 gallons of water containing 10% tri sodium phosphate dodecyl hydrate and then by an aqueous slurry containing 100 sacks of Portland cement containing 4% calcium chloride to accelerate set.

The initial sodium silicate solution forms a gel upon admixture with the CaCl$_2$ brine in the initial flow areas of the formation and thereby diverts the remaining fluid to other areas. The Portland cement sets fairly rapidly on contacting the sodium silicate solution thus reinforcing the weak section and forcing the remaining cement into the channels leading to the producing section. The setting of the Portland cement is, however, substantially delayed relative to what it would have been in the absence of the trisodium phosphate component in the above-noted aqueous spacer composition.

While the present invention has been described herein by reference to certain specific embodiments and illustrative examples thereof, such is not to be understood or interpreted as in any way limiting the scope of the instantly claimed invention.

What is claimed is:

1. In a process for plugging a zone in a subterranean formation by sequentially injecting an aqueous solution of a water soluble silicate material followed by a quantity of an aqueous spacer material and then by a quantity of an aqueous hydraulic cement slurry, the improvement comprising incorporating into said silicate solution, said aqueous spacer material or said hydraulic cement slurry a water soluble, dibasic or tribasic alkali metal or ammonium phosphate salt or a mixture thereof in an amount sufficient to reduce the rate of gel formation which occurs when said silicate material, spacer and hydraulic cement are intermingled.

2. The process of claim 1 wherein the water soluble phosphate salt is trisodium phosphate or disodium phosphate.

3. The process of claim 1 wherein the water soluble phosphate salt is incorporated into the aqueous spacer material.

4. The process of claim 3 wherein the water soluble phosphate salt constitutes, on an anhydrous basis, from about 2 to about 10 weight percent of said aqueous spacer material.

5. The process of claim 3 wherein the water soluble phosphate salt constitutes, on an anhydrous basis, from about 2.5 to about 5 weight percent of said aqueous spacer material.

6. The process of claim 1 wherein the water soluble phosphate salt is employed in an amount sufficient to provide a delayed gelation time of at least about 0.5 hours following the intermingling of said water soluble silicate, cement and spacer materials.

7. The process of claim 6 wherein the water soluble phosphate salt is trisodium phosphate or disodium phosphate.

8. The process of claim 1 wherein the hydraulic cement material is a Portland cement composition.

9. The process of claim 1 wherein the water soluble silicate is a sodium silicate material.

10. The process of claim 1 wherein the water soluble silicate comprises silicon dioxide and sodium oxide in a ratio of from about 0.5 to about 4 parts by weight of silicon dioxide per part by weight of sodium oxide.

11. The process of claim 1 which further comprises preceding the sequential injection of the aqueous silicate solution, spacer and cement slurry by the sequential injection of an aqueous calcium chloride solution followed by an aqueous spacer fluid.

12. The process of claim 1 wherein the zone to be plugged in said subterranean formation is a lost circulation zone encountered in a well drilling or cementing operation.

13. The process of claim 1 wherein the zone to be plugged is one responsible for undesirable formation brine flow in a producing oil or gas well.

14. The process of claim 1 wherein the zone to be plugged is associated with an injection well in an enhanced oil recovery operation and wherein the plugging of said zone is for the purpose of diverting the flow of injected fluid from regions of relatively high formation permeability to regions of the formation having relatively lower permeability.

* * * * *